United States Patent
Takagi

(10) Patent No.: US 9,266,543 B2
(45) Date of Patent: Feb. 23, 2016

(54) TRAIN PROTECTION DEVICE AND TRAIN POSITION DECISION METHOD

(75) Inventor: Masamichi Takagi, Chiyoda-ku (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 214 days.

(21) Appl. No.: 13/991,245

(22) PCT Filed: Dec. 7, 2010

(86) PCT No.: PCT/JP2010/071913
§ 371 (c)(1),
(2), (4) Date: Jun. 3, 2013

(87) PCT Pub. No.: WO2012/077184
PCT Pub. Date: Jun. 14, 2012

(65) Prior Publication Data
US 2013/0248658 A1 Sep. 26, 2013

(51) Int. Cl.
*B61L 25/02* (2006.01)
*G01S 19/45* (2010.01)
*G01S 19/50* (2010.01)

(52) U.S. Cl.
CPC ............ *B61L 25/025* (2013.01); *B61L 25/026* (2013.01); *G01S 19/45* (2013.01); *G01S 19/50* (2013.01); *B61L 2205/04* (2013.01)

(58) Field of Classification Search
CPC . B61L 25/025; B61L 25/026; B61L 2205/04; G01S 19/50; G01S 19/45
See application file for complete search history.

(56) References Cited

U.S. PATENT DOCUMENTS

| 2006/0190163 A1* | 8/2006 | Anderson | 701/201 |
| 2009/0177344 A1* | 7/2009 | James et al. | 701/19 |
| 2009/0234523 A1* | 9/2009 | Nandedkar et al. | 701/20 |

FOREIGN PATENT DOCUMENTS

| JP | 61-090069 A | 5/1986 |
| JP | 63-066414 A | 3/1988 |
| JP | 63-274000 A | 11/1988 |
| JP | 2-035312 A | 2/1990 |
| JP | 8-086853 A | 4/1996 |
| JP | 2001-056234 A | 2/2001 |

(Continued)

OTHER PUBLICATIONS

International Search Report (PCT/ISA/210) issued on Mar. 15, 2011, by the Japanese Patent Office as the International Searching Authority for International Application No. PCT/JP2010/071913.

(Continued)

*Primary Examiner* — Zachary Kuhfuss
(74) *Attorney, Agent, or Firm* — Buchanan Ingersoll & Rooney PC

(57) ABSTRACT

A train protection device, which decides a position of an own train on track by using GPS satellites, includes: a GPS reception unit; a tachogenerator unit; a track-information storage unit; and a position decision unit. The position decision unit decides the position of the own train based on the GPS signal, the reception state value, the running distance from the reference position, the current speed, and the information of a track on which the own train runs. When the reception state value is equal to or larger than a threshold, the position decision unit decides a position as a current train position by adding, with respect to a forward direction of the track on which the own train runs, a correction value.

20 Claims, 1 Drawing Sheet

(56) References Cited

FOREIGN PATENT DOCUMENTS

| | | |
|---|---|---|
| JP | 2002-067960 A | 3/2002 |
| JP | 2003-294825 A | 10/2003 |
| JP | 2004-271219 A | 9/2004 |
| JP | 2004-271255 A | 9/2004 |
| JP | 2007-284013 A | 11/2007 |
| JP | 2008-247217 A | 10/2008 |
| JP | 2009-008491 A | 1/2009 |
| JP | 2009-042179 A | 2/2009 |
| JP | 2010-179737 A | 8/2010 |
| WO | WO 2007/135808 A1 | 11/2007 |

OTHER PUBLICATIONS

Written Opinion (PCT/ISA/237) issued on Mar. 15, 2011, by the Japanese Patent Office as the International Searching Authority for International Application No. PCT/JP2010/071913.

* cited by examiner

TRAIN PROTECTION DEVICE AND TRAIN POSITION DECISION METHOD

FIELD

The present invention relates to a train protection device and a train position decision method that decide a train position on a track by using GPS satellites.

BACKGROUND

Conventionally, as a method of detecting a running position of a train, a method capable of: accumulating values, each of which is obtained by multiplying the number of wheel rotations obtained from a tachogenerator by a wheel diameter; and obtaining a running distance and calculating a position based on the accumulated running distance while using position information of a ground coil of a train protection device placed on a track as a reference is widely known. Meanwhile, Patent Literature 1 mentioned below discloses a technique capable of calculating a position based on position information of the GPS (Global Positioning System), a yaw angular velocity, and speed information of a tachogenerator, thereby improving positional accuracy.

In Patent Literature 1 mentioned below, when the reception reliability of GPS information is high, an own-train-position detection system calculates a position of the own train based on the GPS information. When the reception reliability of the GPS information is medium, the own-train-position detection system calculates a track curvature based on the yaw angular velocity and the information of the tachogenerator while using the GPS information as the reference and compares this curvature with known track curvature information to identify the position of the own train. When the reception reliability of the GPS information is low, the own-train-position detection system uses the running distance provided by the tachogenerator as the reference and compares the track curvature calculated based on the yaw angular velocity and the speed information with the known track curvature information to identify the position of the own train. The track curvature information is obtained by recording the yaw angular velocity, the speed, and the position information in a preliminary test run, associating the recorded information with the curvature, and storing the associated information.

CITATION LIST

Patent Literature

Patent Literature 1: Japanese Patent Application Laid-open No. 2004-271255

SUMMARY

Technical Problem

However, according to the conventional technique mentioned above, when car characteristics change, the yaw angular velocity changes and thus the curvature information also changes. Accordingly, to install the own-train-position detection system in a train with different car characteristics, each time the system is installed, the yaw angular velocity, the speed, and the position information need to be measured again in a preliminary test run and the track curvature information needs to be recorded.

The present invention has been made in view of the above problems, and an object of the present invention is to provide a train protection device and a train position decision method that can decide a train position by performing a correction while considering the reliability of positional accuracy based on GPS satellites without requiring a preliminary test run.

Solution to Problem

To solve the above problems and achieve the object a train protection device that decides a position of an own train on a track by using GPS satellites, the train protection device includes: a GPS reception unit that identifies a position of the own train based on a GPS signal received from GPS satellites and outputs the identified position of the own train with information of a reception state value indicating a reception state of the GPS signal from GPS satellites at a time when the GPS signal is received; a tachogenerator unit that detects a running distance from a reference position of the own train and a current speed of the own train based on number of wheel rotations of the own train and outputs the running distance and the current speed; a track-information storage unit that associates a latitude and a longitude with information of a track on which the own train runs and stores therein associated information; and a position decision unit that decides a position of the own train based on the position of the own train that bases on the GPS signal, the reception state value, the running distance from the reference position, the current speed, and the information of a track on which the own train runs. When the reception state value is equal to or larger than a threshold for determining accuracy in the position of the own train based on the GPS signal, the position decision unit decides a position as a current train position by adding, with respect to a forward direction of the track on which the own train runs, a correction value calculated based on a state of the own train to the position of the own train that bases on the GPS signal And when the reception state value is smaller than the threshold, the position decision unit decides a position as a current train position by adding, with respect to the forward direction of the track on which the own train runs, the correction value to a position obtained by accumulating the running distance with respect to the reference position.

Advantageous Effects of Invention

The train protection device according to the present invention can decide a train position while considering the reliability of positional accuracy based on GPS satellites and perform a train control based on this train position, thereby safely stopping a train with accuracy according to a reception state of the GPS satellites.

DESCRIPTION OF EMBODIMENTS

Exemplary embodiments of a train protection device and a train position decision method according to the present invention will be explained below in detail with reference to the accompanying drawings. The present invention is not limited to the embodiments.

First Embodiment.

Figure 1:
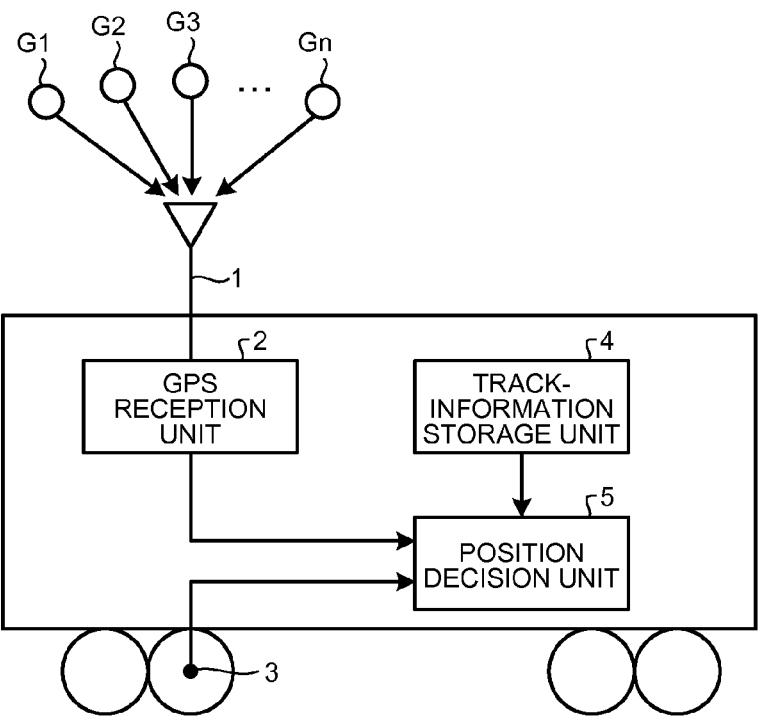
FIG. 1 is a configuration example of a train protection device according to a first embodiment of the present invention.

FIG. 1 is a configuration example of a train protection device according to the present embodiment. The train protection device includes a GPS antenna 1, a GPS reception unit 2, a tachogenerator 3, a track-information storage unit 4, and a position decision unit 5.

The GPS antenna 1 receives a GPS signal from a receivable GPS satellite among GPS satellites G1 to Gn. The GPS reception unit 2 obtains a position of the own train based on the GPS signal from the GPS satellite received by the GPS antenna 1. The tachogenerator 3 detects a running distance and a speed of the own train. The track-information storage unit 4 is a storage unit for associating information of a latitude and a longitude with information of a track on which the own train runs and storing the information therein. The information of the track is provided for each track on which the train runs and the track information is not different for each train. The position decision unit 5 decides the position of the own train based on information from the GPS reception unit 2, the tachogenerator 3, and the track-information storage unit 4. A method in which the GPS antenna 1 is placed at a first car of the train to decide a train head position will be explained as an example.

A train position decision method in the train protection device will be explained below. The GPS reception unit 2 first obtains the position of the own train based on the GPS signal from the GPS satellite received by the GPS antenna 1. The GPS reception unit 2 then outputs, as information indicating a reception state of the GPS signal from the GPS satellite, the number of received GPS satellites or a reception level of the GPS signal, or both thereof together with information of the position of the own train obtained based on the GPS signal, to the position decision unit 5.

The tachogenerator 3 obtains a current speed and a running distance from a reference position of the own train based on the number of wheel rotations and the wheel diameter and outputs these pieces of information to the position decision unit 5. It is assumed that the reference position is based on a start point of the train or a position decided by the position decision unit 5 before the previous position decision, and details thereof will be explained later.

The position decision unit 5 then decides the reception state of the GPS signal from the GPS satellite based on information obtained from the GPS reception unit 2 and decides the position of the own train based on information obtained from the GPS reception unit 2 and the tachogenerator 3 and the track information read from the track-information storage unit 4. Assuming the position of the own train obtained from the GPS reception unit 2 or the tachogenerator 3 is indicated by P and a correction value for correcting the position of the own train is indicated by K, the position decision unit 5 decides the position of the own train based on the following expression (1).

$$\text{The position of the own train} = P + K \quad (1)$$

When the reception state of the GPS signal is good, the position decision unit 5 sets the position of the own train based on the GPS signal obtained from the GPS reception unit 2 as P in the expression (1). When the reception state of the GPS signal is poor, the position decision unit 5 sets position information based on information of the running distance from the reference position obtained from the tachogenerator 3 as P in the expression (1).

As a method of determining the reception state of the GPS signal, that is, a method of determining accuracy in the position of the own train based on the GPS signal, for example, the number of received GPS satellites is provided. Specifically, when GPS signals are received from GPS satellites equal to or larger in number than a threshold set in advance in the GPS antenna 1 and the GPS reception unit 2, the position decision unit 5 sets the position of the own train based on the GPS signal obtained from the GPS reception unit 2 as P. When GPS signals are not received from GPS satellites equal to or larger in number than the threshold set in advance in the GPS antenna 1 and the GPS reception unit 2, the position decision unit 5 sets the position information based on the information of the running distance from the reference position obtained from the tachogenerator 3 as P. For the method of determining the reception state of the GPS satellite, the present invention is not limited to usage of the number of received GPS satellites, and other methods including usage of the reception level of the GPS signal may be used.

The position decision unit 5 calculates the correction value K based on the current state of the own train. For example, when the speed of the own train is indicated by "a", the current reception state of the GPS satellite is indicated by "b", and reception reliability while considering the reception state of the GPS satellite from a time point in the past to the current time point is indicated by "c", the position decision unit 5 decides the correction value according to a function of the following expression (2) with these factors as parameters.

$$\text{The correction value } K = f(a, b, c) \quad (2)$$

The position decision unit 5 sets the operational expression $K = f(a, b, c)$ to increase the correction value K when the speed of the own train is high, when the current reception state of the GPS satellite is poor, or when the reception reliability is low. The position decision unit 5 may set the operational expression $K = f(a, b, c)$ to obtain the correction value $K = 0$ when the current reception state of the GPS satellite is the best, for example, when the number of received GPS satellites is equal to or larger than the threshold mentioned above and reaches a value that can be determined the reception state is at the best level. A case of the correction value $K = 0$ means that the position decision unit 5 uses the position of the own train based on the GPS signal obtained from the GPS reception unit 2 as it is without correction.

While the position decision unit 5 can determine the current reception state of the GPS satellite based on the number of received GPS satellites as explained above, the present invention is not limited thereto.

As for the reception reliability, there is a method of expressing the reception reliability by accumulating reception states from the past, for example, by the position decision unit 5 that increases a coefficient indicating the reception reliability by one rank when the reception state of the GPS signal from the GPS satellite is good, that is, when the GPS signal is received from GPS satellites equal to or larger in number than the threshold set in advance; and that decreases the coefficient indicating the reception reliability by one rank when the reception state of the GPS signal from the GPS satellite is poor, that is, when the GPS signal is not received from GPS satellites equal to or larger in number than the threshold set in advance. Alternatively, the reception reliability may be set by determining how many times the reception state of the GPS signal from the GPS satellite is good among past five position decisions including the current time, or other methods may be used. In any one of these cases, an upper limit and a lower limit may be set with respect to the reception reliability.

The position decision unit 5 sets the operational expression $K = f(a, b, c)$ so that the largest error that is assumable from the state of each parameter is calculated. That is, the position decision unit 5 calculates the worst value according to the state of each parameter and sets the value as the correction value.

For example, when a movement limit of the train is given, in the train protection device installed in the train, a movement protection unit (not shown) needs to perform a control not to pass through the movement limit at danger. When the reception state of the GPS signal from the GPS satellite is the best, the accuracy in the position of the own train based on the GPS signal obtained from the GPS reception unit 2 is regarded to be high and thus a special correction does not need to be performed. However, when the reception state of the GPS signal from the GPS satellite is not good, the accuracy decreases and thus a position calculated from the GPS signal may include an error.

The position decision unit 5 thus adds the largest error that is assumable as the correction value in a forward direction of the own train to decide the train head position. In this case, while the decided train head position is ahead of the actual train head position, the movement protection unit of the train protection device can reliably stop the train before the movement limit by determining the decided position as the train head position.

While the accuracy in the obtained train position may be lower than in the method of Patent Literature 1 mentioned in the section of Background, a preliminary test run or the like is not required and installations such as a ground coil do not need to be provided on a track side. Accordingly, the present invention can be realized by a simple system.

While a case of calculating the correction value K by using three parameters has been explained above, the present invention is not limited thereto. The correction value K may be calculated by using other parameters or one or two of the three parameters. In addition, a coefficient for weighting each parameter may be used.

When the reception state of the GPS signal is poor, the position information based on the information of the running distance from the reference position obtained from the tachogenerator 3 is set as P. When the reception state of the GPS signal is the best, that is, when the correction value K=0, the tachogenerator 3 can update the reference position to be the position of the own train based on the GPS signal when the reception state is the best. Accordingly, even when the reception state of the GPS signal is worsened or even when the GPS signal cannot be received, the position information obtained when the reception state of the GPS signal is the best can be effectively utilized and the accumulated running distance is reduced as compared to the case of using the start point of the train as the reference, so that the accuracy in the position of the own train can be increased. While the case of K=0 has been explained above, the present invention is not limited thereto. Also in cases other than the case of K=0, when the train position is decided by using the position of the own train based on the GPS signal, the reference position may be updated to be the position of the own train based on the GPS signal when the train position is decided.

As explained above, in the train protection device according to the present embodiment, the position decision unit 5 adds the largest error that is assumable from the reception state from the GPS satellite or the like as the correction value to the position information obtained from the GPS signal or the position information obtained from the running distance based on the reception state of the GPS signal from the GPS satellite in the forward of the train, thereby calculating the train head position. Accordingly, the train protection device can decide the train head position as a position that is not behind the actual train head position regardless of the reception state of the GPS signal and can reliably stop the train before a stop limit.

Second Embodiment.

The method of deciding the head position of the own train has been explained in the first embodiment. In a second embodiment of the present invention, a method of deciding a tail position of the own train will be explained. Features different from those of the first embodiment are explained below.

Figure 2:
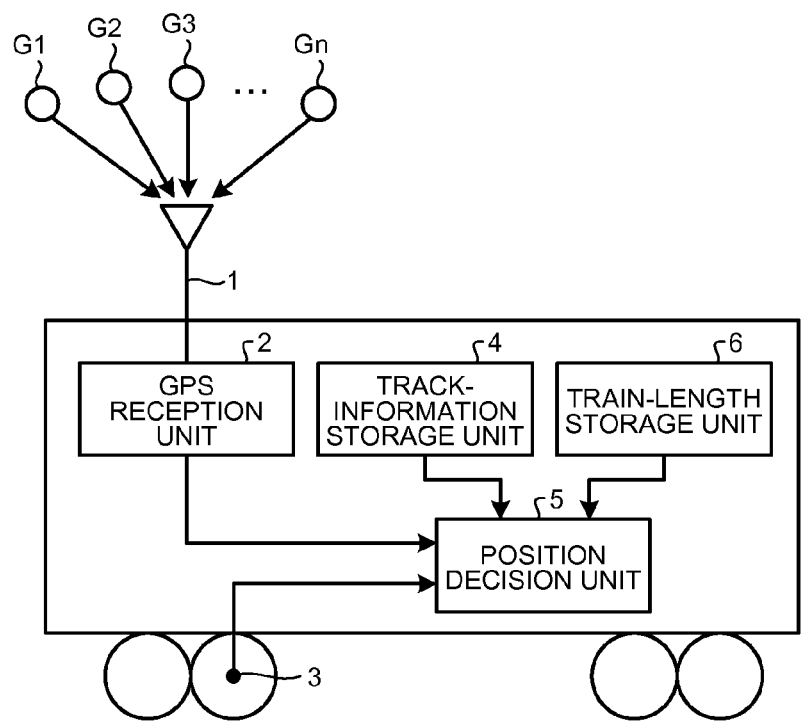
FIG. 2 is a configuration example of a train protection device according to a second embodiment of the present invention.

FIG. 2 is a configuration example of a train protection device according to the present embodiment. The train protection device includes the GPS antenna 1, the GPS reception unit 2, the tachogenerator 3, the track-information storage unit 4, the position decision unit 5, and a train-length storage unit 6. The train-length storage unit 6 is a storage unit that has information of the length of the own train (train length) stored therein. The length is assumed to be different for each train.

A train position decision method for the tail position in the train protection device will be explained next. Similarly to the first embodiment, the GPS reception unit 2 obtains the position of the own train based on the GPS signal from the GPS satellite received by the GPS antenna 1 and outputs the position to the position decision unit 5. The tachogenerator 3 obtains the speed and the running distance from the reference position of the own train and outputs the obtained information to the position decision unit 5.

The position decision unit 5 then decides the tail position of the own train based on information obtained from the GPS reception unit 2 and the tachogenerator 3 and information read from the track-information storage unit 4 and the train-length storage unit 6. When the position of the own train obtained from the GPS reception unit 2 or the tachogenerator 3 is indicated by P, the train length stored in the train-length storage unit 6 is indicated by L, and the correction value is indicated by K, the tail position of the own train is decided based on the following expression (3). The method of setting P and K is the same as that of the first embodiment.

$$\text{The tail position of the own train} = P - L - K \tag{3}$$

That is, an assumed error is added in the rearward (subtracted with reference to the forward direction) of the tail position of the own train. For example, when a speed limit section is set, in the train protection device installed in the train, a speed control unit (not shown) needs to perform a control so that the train runs at a speed equal to or lower than a speed limit from when the first car enters the speed limit section to when the tail of the train exits the speed limit section. When the reception state of the GPS signal is the best, the accuracy in the tail position of the own train based on the GPS signal obtained from the GPS reception unit 2 is regarded to be high and thus no special correction needs to be performed. However, when the reception state of the GPS signal is not good, the accuracy decreases and thus a position calculated from the GPS signal may include an error. When the position based on the GPS signal is used as it is in this case, the train may run at a speed exceeding the limiting speed before the tail of the train exits the speed limit section.

The position decision unit 5 thus adds (subtracts with reference to the forward direction) the largest error that is assumable as the correction value in the rearward of the tail of the own train to decide the train tail position. In this case, while the decided train tail position is behind the actual train tail position, the speed control unit of the train protection device can reliably cause the train to run at a speed equal to or lower than the limiting speed in the limiting speed section by controlling the speed based on the decided position.

Similarly to the first embodiment, when the reception state of the GPS signal is poor, the position information based on the information of the running distance from the reference position obtained from the tachogenerator 3 is set as P. When the reception state of the GPS signal is the best, that is, when the correction value K=0, the tachogenerator 3 can update the reference position to be the position of the own train based on the GPS signal when the reception state is the best. Also in cases other than the case of K=0, when the train position is decided by using the position of the own train based on the GPS signal, the reference position may be updated to be the position of the own train based on the GPS signal when the train position is decided. Because the GPS antenna 1 is provided at the first car of the train, the reference position is for the train head position. When the GPS antenna 1 is provided at the last car of the train, the reference position is for the train tail position and the process of subtracting the train length can be omitted.

As explained above, in the train protection device according to the present embodiment, the position decision unit 5 subtracts the largest error that is assumable from the length of the own train, the reception state from the GPS satellite, and the like, as the correction value from the position information obtained from the GPS signal or the position information obtained from the running distance based on the reception state of the GPS signal from the GPS satellite to decide the train tail position. Accordingly, the train protection device can decide the train tail position as a position that is not ahead of the actual train tail position regardless of the reception state of the GPS signal and reliably causes the train to run at a speed equal to or lower than a limiting speed in a limiting speed section.

INDUSTRIAL APPLICABILITY

As described above, the train protection device and the train position decision method according to the present invention are useful in identifying the train position and is particularly suitable for a case in which an installation of a ground coil that indicates a reference position is not included on a track.

REFERENCE SIGNS LIST

1 GPS antenna
2 GPS reception unit
3 tachogenerator
4 track-information storage unit
5 position decision unit
6 train-length storage unit

The invention claimed is:
1. A train protection device that decides a position of an own train on a track by using GPS satellites, the train protection device comprising:
   a GPS reception unit that identifies a position of the own train based on a GPS signal received from GPS satellites and outputs the identified position of the own train with information of a reception state value indicating a reception state of the GPS signal from GPS satellites at a time when the GPS signal is received;
   a tachogenerator unit that detects a running distance from a reference position of the own train and a current speed of the own train based on number of wheel rotations of the own train and outputs the running distance and the current speed;
   a track-information storage unit that associates a latitude and a longitude with information of a track on which the own train runs and stores therein associated information; and
   a position decision unit that decides a position of the own train based on the GPS signal, the reception state value, the running distance from the reference position, the current speed, and the information of a track on which the own train runs, and the position decision unit compares the reception state value to a threshold for determining accuracy in the position of the own train based on the GPS signal, wherein
   when the reception state value is equal to or larger than the threshold, the position decision unit decides a position as a current train position by adding, with respect to a forward direction of the track on which the own train runs, a correction value calculated based on a state of the own train to the position of the own train based on the GPS signal, and
   when the reception state value is smaller than the threshold, the position decision unit decides a position as a current train position by adding, with respect to the forward direction of the track on which the own train runs, the correction value to a position obtained by accumulating the running distance with respect to the reference position.

2. The train protection device according to claim 1, wherein the reception state value is a number of received GPS satellites.

3. The train protection device according to claim 1, wherein the reception state value is a reception level of a GPS signal from GPS satellites.

4. The train protection device according to claim 1, wherein the position decision unit calculates a correction value based on the reception state value, the speed, and reception reliability including information of a reception state from past to present as the state of the own train.

5. The train protection device according to claim 4, wherein the position decision unit increases a correction value as a speed of the own train is increased.

6. The train protection device according to claim 4, wherein the position decision unit increases a correction value as the number of received GPS satellites is reduced.

7. The train protection device according to claim 4, wherein the position decision unit increases a correction value as reception reliability is reduced.

8. The train protection device according to claim 1, wherein when the reception state value is equal to or larger than the threshold and reaches a value enabling to determine that a reception state is at a best level, the position decision unit sets the correction value to zero.

9. The train protection device according to claim 1, wherein the tachogenerator unit accumulates the running distance while using a start point as a reference position at a time of start, and when the position decision unit decides a train position by adding the correction value to a position of the own train based on a GPS signal, the tachogenerator unit updates the reference position to be a position of the own train based on the GPS signal when the position decision unit decides the train position and accumulates a running distance with respect to the updated reference position.

10. A train protection device that decides a position of an own train on a track by using GPS satellites, the train protection device comprising:
   a GPS reception unit that identifies a position of the own train based on a GPS signal received from GPS satellites and outputs the identified position of the own train with information of a reception state value indicating a reception state of the GPS signal from GPS satellites when the GPS reception unit identifies the position of the own train;

a tachogenerator unit that detects a running distance from a reference position of the own train and a current speed of the own train based on number of wheel rotations of the own train and outputs the running distance and the current speed;

a track-information storage unit that associates a latitude and a longitude with information of a track on which the own train runs and stores therein associated information;

a train-length storage unit that has a train length of the own train stored therein; and a position decision unit that decides a position of the own train based on the GPS signal, the reception state value, the running distance from the reference position, the current speed, the information of a track on which the own train runs, and the train length of the own train, and the position decision unit compares the reception state value to a threshold for determining accuracy in the position of the own train based on the GPS signal, wherein when the reception state value is equal to or larger than the threshold, the position decision unit decides a position as a current train tail position by subtracting, with respect to a forward direction of the track on which the own train runs, a correction value calculated based on a state of the own train and the train length from the position of the own train based on the GPS signal, and when the reception state value is smaller than the threshold, the position decision unit decides a position as a current train tail position by subtracting, with respect to the forward direction of the track on which the own train runs, the correction value and the train length from a position obtained by accumulating the running distance with respect to the reference position.

11. The train protection device according to claim 10, wherein the reception state value is a number of received GPS satellites.

12. The train protection device according to claim 10, wherein the reception state value is a reception level of a GPS signal from GPS satellites.

13. The train protection device according to claim 10, wherein the position decision unit calculates a correction value based on the reception state value, the speed, and reception reliability including information of a reception state from past to present as the state of the own train.

14. The train protection device according to claim 13, wherein the position decision unit increases a correction value as a speed of the own train is increased.

15. The train protection device according to claim 13, wherein the position decision unit increases a correction value as the number of received GPS satellites is reduced.

16. The train protection device according to claim 13, wherein the position decision unit increases a correction value as reception reliability is reduced.

17. The train protection device according to claim 10, wherein when the reception state value is equal to or larger than the threshold and reaches a value enabling to determine that a reception state is at a best level, the position decision unit sets the correction value to zero.

18. The train protection device according to claim 10, wherein the tachogenerator unit accumulates the running distance while using a start point as a reference position at a time of start, and when the position decision unit decides a train tail position by subtracting the correction value and the train length from the position of the own train based on the GPS signal, the tachogenerator unit updates the reference position to be a position of the own train based on the GPS signal when the position decision unit decides the train tail position and accumulates a running distance with respect to the updated reference position.

19. A train position decision method in a train protection device that decides a position of an own train on a track by using GPS satellites, the train position decision method comprising:

wherein the train protection device includes a track-information storage unit that associates a latitude and a longitude with information of a track on which the own train runs and stores therein associated information, a GPS receiving step of identifying a position of the own train based on a GPS signal received from GPS satellites and outputting the identified position of the own train with information of a reception state value indicating a reception state of the GPS signal from GPS satellites when the position of the own train is identified;

a distance/speed detecting step of detecting a running distance from a reference position of the own train and a current speed of the own train based on number of wheel rotations of the own train and outputting the running distance and the current speed; and a position deciding step of deciding a position of the own train based on the GPS signal, the reception state value, the running distance from the reference position, the current speed, and the information of a track on which the own train runs, and comparing the reception state value to a threshold for determining accuracy in the position of the own train based on the GPS signal, wherein at the position deciding step, when the reception state value is equal to or larger than the threshold, a position is decided as a current train position by adding, with respect to a forward direction of the track on which the own train runs, a correction value calculated based on a state of the own train to the position of the own train based on the GPS signal, and when the reception state value is smaller than the threshold, a position is decided as a current train position by adding, with respect to the forward direction of the track on which the own train runs, the correction value to a position obtained by accumulating the running distance with reference to the reference position.

20. A train position decision method in a train protection device that decides a position of an own train on a track by using GPS satellites, the train position decision method comprising:

wherein the train protection device includes a track-information storage unit that associates a latitude and a longitude with information of a track on which the own train runs and stores therein associated information, and a train-length storage unit that has a train length of the own train stored therein, a GPS receiving step of identifying a position of the own train based on a GPS signal received from GPS satellites and outputting the identified position of the own train with information of a reception state value indicating a reception state of the GPS signal from GPS satellites when the position of the own train is identified;

a distance/speed detecting step of detecting a running distance from a reference position of the own train and a current speed of the own train based on number of wheel rotations of the own train and outputting the running distance and the current speed; and a position deciding step of deciding a position of the own train based on the GPS signal, the reception state value, the running distance from the reference position, the current speed, the information of a track on which the own train runs, and the train length of the own train, and comparing the reception state value to a threshold for determining accuracy in the position of the own train based on the GPS signal;

wherein at the position deciding step, when the reception state value is equal to or larger than the threshold, a position is decided as a current train tail position by subtracting, with respect to a forward direction of the track on which the own train runs, a correction value calculated based on a state of the own train and the train length from the position of the own train based on the GPS signal, and when the reception state value is smaller than the threshold, a position is decided as a current train tail position by subtracting, with respect to the forward direction of the track on which the own train runs, the correction value and the train length from a position obtained by accumulating the running distance with respect to the reference position.

* * * * *